Jan. 8, 1957 J. J. POWLAS 2,776,864
PISTON ASSEMBLY
Filed June 21, 1954
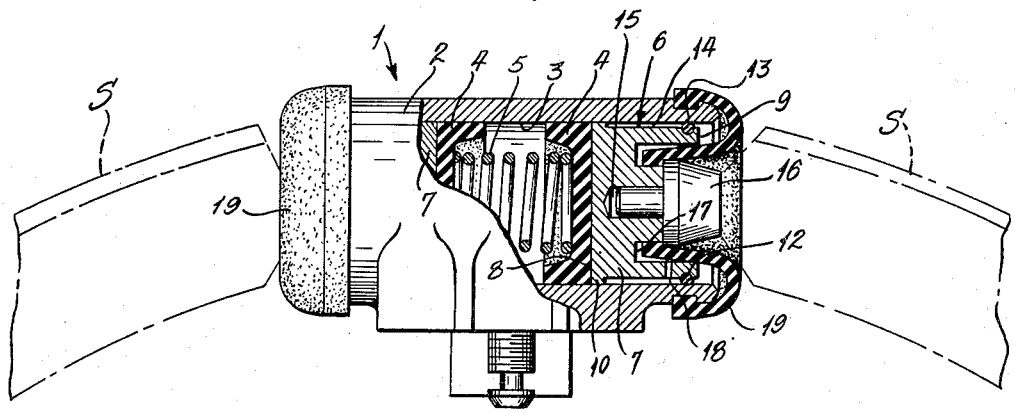
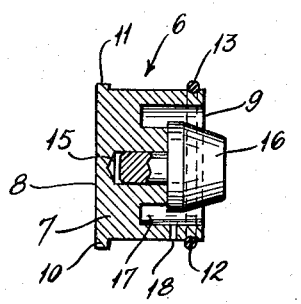
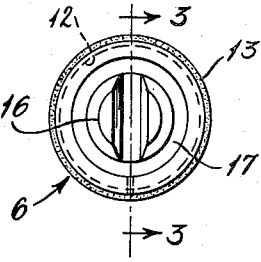
INVENTOR.
JAMES J. POWLAS
By Gravely, Lieder, Woodruff and Wills
ATTORNEYS.

United States Patent Office 2,776,864
Patented Jan. 8, 1957

2,776,864

PISTON ASSEMBLY

James J. Powlas, South Bend, Ind., assignor to Wagner Electric Corporation, St. Louis, Mo., a corporation of Delaware Application June 21, 1954, Serial No. 438,048

7 Claims. (Cl. 309—4)

This invention relates generally to the automotive brake actuation art, and more particularly to a novel piston assembly for a wheel cylinder for reducing the noise which is sometimes caused by the actuation of the brakes.

In some automobile brake constructions employing brake shoes, it is indicated that a vibration is produced between the brake shoe and the cooperating drum during the braking application with this vibration being transmitted from the brake shoe to the piston and cooperating wheel cylinder and then into the backing plate and the suspension means therefor. Apparently a resonance condition is set up whereby the frequency of the vibration created between the shoe and the drum is the same as the natural frequency of the backing plate or suspension means thereby creating an audible noise or squeal. Whatever the source, it is a fact that many automobile brakes produce a noise which is irritating to the operator of the automobile.

The principal object of the present invention is to provide a novel piston assembly for use with wheel cylinders, which will eliminate the noise or brake squeal encountered in certain types of brake constructions. More particularly, it is an object to provide a piston assembly including dampening means for reducing the vibration otherwise transmitted by the piston.

These and other objects and advantages will become apparent hereinafter.

Briefly, the invention comprises an improved piston assembly for use in a wheel cylinder, having a body portion with flange-like means at one end and resilient means at the other end for contact with the inner wall of the wheel cylinder.

The invention also consists in the parts, elements and arrangement and combination of parts hereinafter described and claimed. In the accompanying drawings which form part of this specification and wherein like numerals refer to like parts wherever they occur:

Fig. 1 is a front elevational view, partially in cross section, of a wheel cylinder provided with a piston assembly illustrating the present invention.

Fig. 2 is an end elevation of the piston assembly, and

Fig. 3 is a longitudinal sectional view taken along line 3—3 of Fig. 2.

For the purposes of this disclosure, the invention is illustrated as applied to a wheel cylinder 1 of conventional construction for actuating brake shoes S (shown in dotted lines). The wheel cylinder 1 is secured to a backing plate (not shown) by suitable means and includes a cylinder 2 having an inner wall 3. Packing cups 4 are positioned within the cylinder 2 to prevent leakage of brake fluid from within the cylinder 2, and are maintained in spaced relationship by a spring 5.

The invention is embodied in a piston assembly 6 movably positioned within the cylinder 2 and outwardly of the packing cups 4 in abutting relation thereto.

The piston assembly 6 includes a piston having a cylindrical body portion 7 with an inner end 8 and an outer end 9. A circumferential outwardly or radially extending flange 10 is provided at the inner end 8 having a flat outer surface 11 in slidable contact with the inner wall 3 of the cylinder 2. A circumferential groove 12 is provided adjacent to the outer end 9 and which a resilient non-metallic O-ring or like resilient member 13 is positioned. The resilient member 13 may be of any conventional cross-sectional shape, an O-ring having been illustrated only for the purpose of disclosure. In order to facilitate rectilinear movement of the piston assembly 6 in the cylinder 2 during braking operations, the flange 10 and the O-ring 13 co-extend radially outwardly beyond the outer surface of the body portion 7 of the piston and are in sliding engagement with the inner wall 3. An annular cavity 14 is defined by the inner wall 3 of the cylinder 2, the piston body 7, the O-ring 13 and the flange 10.

The primary purpose of the O-ring 13 is to act as a dampening means to reduce any vibration transmitted to the cylinder 2 from the piston during braking operations. Inasmuch as the O-ring is positioned between the piston body 7 and the inner wall 3, a sealing action may be effected and any fluid escaping past the packing cups 4 could be retained in the cavity 14. However, the O-ring is not designed to withstand pressure and could be displaced or expelled by the accumulation of fluid in the cavity 14. Consequently, pressure relieving means have been provided to permit fluid to escape from the cavity 14, as will be described more fully hereinafter.

A central aperture 15 is provided in the outer end 9 at the axis of the body portion 7 for receiving a slotted insert 16 therein. The brake shoes S are in engagement with the slotted insert 16 and are operated by the movement of the piston assembly 6 outwardly through the force of the fluid pressure within the cylinder 2.

An annular groove 17 is formed in the outer end 9 of the body portion 7 radially outwardly of the central aperture 15 formed therein. A small port or passage 18 is formed in the body portion 7 between the annular groove 17 and the cavity 14, and adjacent to the O-ring 13. The port 18 comprises the pressure relieving means for permitting the escape of any fluid which may have collected in the cavity 14, and which might otherwise build up pressure against the O-ring 13.

A conventional sealing bolt 19 is positioned adjacent to the cylinder 2 and extends inwardly to the annular groove 17 in abutting relationship therewith to prevent the entrance of dust or other foreign matter into the cylinder 2. However, the boot 19 is not a seal against fluid under pressure, and it will permit brake fluid which may have collected in the annular groove 17, to escape to the atmosphere. It is therefore apparent, that any fluid which escapes past the packing cups 4 and into the cavity 14 will not build up a pressure against the O-ring 13, but will pass through the port 18 and into the annular groove 17, from where it may escape past the boot 19 to the atmosphere.

In operation, brake fluid under pressure in the space between the packing cups 4 forces the piston assemblies 6 outwardly, thereby moving the brake shoes S into contact with the brake drum (not shown). When the braking operation is completed and the fluid pressure in the piston assemblies 6 is released, the brake shoes S are retracted from the brake drum by conventional means thereby causing the piston assemblies to move inwardly in the wheel cylinders 1 into position for the next braking operation.

In a conventional wheel cylinder construction, the entire outer surface of the piston is in slidable contact with the inner wall 3 of the cylinder 2 thereby providing a metal-to-metal contact throughout the length of the piston. Any vibration caused in such a piston construction, as may occur when the brake shoes are in contact with the brake drum during the braking operation (whether by sidewise movement or sidewise pivotal movement at either end), is transmitted to the wheel cylinder from any point on the piston. In the present piston assembly 6, however, any transmission of noise by a metal-to-metal contact caused by the aforementioned vibration is limited to the narrow flange 10, and the resilient O-ring 13 positioned between the body portion 7 and the cylinder 2 has a dampening effect whereby the noise so produced is minimized.

This invention is intended to cover all changes and modifications of the example of the invention herein chosen for the purposes of the disclosure, which do not constitute departures from the spirit and scope of the invention.

What I claim is:

1. A piston assembly for use with a cylinder having an inner wall, comprising a piston body having opposed ends, a flange extending radially outwardly from adjacent one end of the piston body for slidable contact with the inner wall of a cylinder, a circumferential groove adjacent to the other end of said piston body, an annular resilient member positioned in said groove and extending radially outwardly from said piston body for slidable contact with the inner wall of the cylinder, said other end of said piston body being adapted to be yieldably spaced from the inner wall by said resilient member.

2. A piston assembly for use with a wheel cylinder having an inner wall, comprising a piston body having opposed ends, a circumferential outwardly extending flange at one end of said piston body for slidable contact with the inner wall of a wheel cylinder, the other end of said piston body having a circumferential groove adjacent thereto with an O-ring positioned therein for slidable contact with the inner wall of a wheel cylinder, said O-ring and said flange co-extending radially outwardly from said piston body so as to form a cavity therebetween when positioned within a wheel cylinder, an annular groove formed in the end of the said piston body inwardly of said circumferential groove, and a port formed in said piston body between said flange and said O-ring and opening into said annular groove.

3. In combination, a cylinder having an inner wall; and a piston assembly positioned within said cylinder and comprising a piston body having opposed ends, rigid means at one end of said piston body in contact with said inner wall for spacing said piston body therefrom, and compressible vibration dampening means adjacent the other end of said piston body in contact with the inner wall for yieldably centering said piston body in spaced relation with the inner wall of said cylinder.

4. In combination, a cylinder having an inner wall; and a piston assembly comprising a piston body having opposed ends, a circumferential flange at one end of said piston body in slidable contact with said inner wall, a circumferential groove adjacent the other end of said piston body having a resilient O-ring positioned therein in slidable contact with the inner wall of said cylinder, said O-ring and said flange co-extending radially outwardly from said piston body to said inner wall and forming a cavity therebetween, an annular groove formed in said other end of the piston body, radially inwardly of said circumferential groove, and a port formed in said piston body between said annular groove and said cavity.

5. In combination, a wheel cylinder including a cylinder having an inner wall and a packing cup positioned therein; and a piston assembly comprising a piston body having opposed ends, a circumferential flange at one end of said piston body in slidable contact with said inner wall, said flanged end being positioned immediately adjacent to said packing cup, the other end of said piston body having a circumferential groove adjacent thereto with a non-metallic resilient O-ring positioned therein in slidable contact with the inner wall of said cylinder, said O-ring and said flange co-extending radially outwardly spacing said piston body from said inner wall and forming a cavity therebetween, an annular groove formed in said other end of the piston body inwardly of said circumferential groove, and a port formed in said piston body between said annular groove and said cavity for relieving fluid pressure which may build up in said cavity and against said resilient O-ring.

6. In combination, a wheel cylinder having an inner wall; and a piston assembly comprising a piston body having opposed ends, rigid means at one end of said piston body in contact with said inner wall maintaining said piston body in substantially fixed spaced relation therewith, and non-metallic resilient means adjacent the other end of said piston body in contact with the inner wall of said wheel cylinder maintaining said piston body in yieldable spaced relation therewith.

7. In combination, a wheel cylinder having an inner wall; and a piston assembly adapted for axial movement in said wheel cylinder, said piston assembly comprising a piston body having opposed ends, a circumferential flange formed on one end of said piston body and extending radially outwardly therefrom to space said piston body from said inner wall, a resilient member adjacent the other end of said piston body and extending radially outwardly to yieldably space said piston body from said inner wall, said resilient member dampening vibration of said wheel cylinder during braking applications, and passage means in said piston body in communication with the side of said resilient member adjacent to said flange and extending to said other end of said piston body.

References Cited in the file of this patent
UNITED STATES PATENTS

| | | |
|---|---|---|
| 2,076,363 | Brunner | Apr. 6, 1937 |
| 2,115,383 | Christensen | Apr. 26, 1938 |
| 2,276,009 | Baldwin | Mar. 10, 1942 |
| 2,308,875 | Geopfrich | Jan. 19, 1943 |
| 2,317,601 | Fowler | Apr. 27, 1943 |